United States Patent [19]
Bailey

[11] 3,845,557
[45] Nov. 5, 1974

[54] CHAIN SAW ANTI-VIBRATION SYSTEM

[75] Inventor: Jay Richard Bailey, Chatsworth, Calif.

[73] Assignee: McCulloch Corporation, Los Angeles, Calif.

[22] Filed: June 28, 1973

[21] Appl. No.: 374,490

[52] U.S. Cl.................. 30/381, 173/162, 248/358 R
[51] Int. Cl............................ B27b 17/02, F16f 7/12
[58] Field of Search .............................. 30/381–389; 173/162; 267/141, 137; 248/15, 22, 24, 358 R

[56] References Cited
UNITED STATES PATENTS

| | | | |
|---|---|---|---|
| 2,215,743 | 9/1940 | Saurer.................................. 248/22 |
| 2,273,869 | 2/1942 | Julien............................. 248/358 X |
| 2,275,966 | 3/1942 | Julien.............................. 248/358 R |
| 2,668,033 | 2/1954 | Lee.................................. 248/358 R |
| 3,372,718 | 3/1968 | Irgens................................... 30/381 |
| 3,531,068 | 9/1970 | Fischer................................. 248/15 |
| 3,685,772 | 8/1972 | Giaccone......................... 248/15 X |
| 3,698,455 | 10/1972 | Frederickson......................... 30/381 |

FOREIGN PATENTS OR APPLICATIONS

237,444   2/1962   Australia............................. 248/24

Primary Examiner—Al Lawrence Smith
Assistant Examiner—K. J. Ramsey
Attorney, Agent, or Firm—Burns, Doane, Swecker & Mathis

[57] ABSTRACT

An improvement in a vibration isolation system for a chain saw having a vibration generating assembly including an engine and a cutter chain drivingly connected with the engine and a supporting and inertia assembly including handle means and a fuel tank which at least partially encompasses the vibration generating assembly. A plurality of vibration isolation assemblies interconnect the vibration generating assembly and the support assembly and each include a first cup mounted upon one of the vibration generating assembly and the supporting assembly and a post mounted upon the other of the vibration generating assembly and the supporting assembly. The post is dimensioned to be coaxially received within the interior of the first cup. Each of the vibration isolation assemblies further includes a second cup composed of an elastomeric material and being dimensioned to contiguously fit within the interior of the first cup. The second cup is provided with at least one elastomeric circumferentially inwardly projecting ring dimensioned to engage, under hoop tension, at least a portion of the exterior surface of the post whereby relative vibrations between the post and first cup will be attenuated by the elastomeric second cup.

10 Claims, 8 Drawing Figures

PATENTED NOV 5 1974　　　　　　　3,845,557

CHAIN SAW ANTI-VIBRATION SYSTEM

BACKGROUND OF THE INVENTION

This invention pertains to a vibration isolation system. More particularly, the invention relates to a system for attenuating vibrations generated by an internal combustion engine and cutting chain of a chain saw.

It has long been recognized that portable chain saws are characterized by a high degree of vibration originating from the chain saw cutting chain and the chain saw internal combustion engine. These vibrations are transmitted from the power train into a supporting handle assembly which is held by an operator. A high degree of vibration of this type tends to cause fatigue in an operator's hands and forearms when the chain saw is used over extended periods of time.

Operator fatigue not only reduces work efficiency but more seriously reduces an operator's ability to react to and control chain saw "kickback" which may induce slippage of an operator's hand from a frame handle into a rapidly moving cutting chain.

Accordingly, for many years efforts have been expended by the chain saw industry in order to reduce the level of vibration transmitted from the engine and cutting chain to the chain saw operator.

In this connection, vibration isolation systems, particularly adapted for use with internal combustion engine operated chain saws, are described in U.S. Frederickson et al U.S. Pat. Nos. 3,542,095 issued Nov. 24, 1970, 3,652,074 issued Mar. 28, 1972, and 3,698,455 issued Oct. 17, 1971, all assigned to the assignee of the subject invention.

Each of these Frederickson et al patents pertains to improved vibration isolating means for chain saws wherein a support means, including handle means and inertia means, defines a cradle-like structure within which a vibrating assembly is resiliently supported. A vibrating assembly includes an internal combustion engine, a guide bar and a cutter chain assembly driven by the internal combustion engine. The vibration isolation system includes generally U-shaped brackets including a pair of elastomeric generally rhomboidal shaped masses mounted between an upper portion of the vibrating assembly and an underside of the inertia means. At least one further vibration isolation means is interposed between the bottom of the vibrating assembly and the support means.

The foregoing described generally triangular vibration isolation assembly extends generally about the center of gravity of the vibrating assembly and lies substantially within a primary plane of vibration of the chain saw vibrating assembly.

The structures featured in the aforenoted Frederickson et al patents are believed to constitute particularly significant advances in the art of minimizing chain saw vibration. Notwithstanding, however, previous advances in the art, it is believed that significant improvements may be yet effectuated.

In this connection it would be highly desirable to provide a vibration isolation system with a variable spring rate wherein the resonant frequency of the vibration isolation system may be continuously maintained below that of the vibration generating assembly. Still further, it would be desirable to provide a low cost vibration isolation system which is essentially fail-safe even in the face of unusual and unexpectedly severe loads.

Additionally, it would be highly desirable to design a vibration isolation system utilizing a high strength ruber with advantageous wear characteristics in a manner wherein the rubber behaves as a spring.

Yet additionally, it would be desirable to provide a vibration isolation system which is characterized by relatively simple construction while providing a maximum stability and operator control during a cutting operation.

OBJECTS AND BRIEF SUMMARY OF THE INVENTION

Objects

It is a general object of the invention to provide a novel vibration isolation system for a chain saw which will obviate or minimize problems such as operator fatigue, as perviously described.

It is a specific object of the invention to provide a novel chain saw vibration isolation assembly possessing a variable spring rate and being operable to maintain the resonant frequency of the vibration isolation assembly beneath that of a vibration generating assembly even during an idle unloaded condition of the vibration generating assembly.

It is a further object of the invention to provide a novel chain saw vibration isolation assembly which is operable to advantageously attenuate vibratory loads imposed along any one of three mutually perpendicular axes.

It is yet a further object of the invention to provide a novel chain saw vibration isolation assembly which is essentially fail-safe even in the face of unexpected and severe loading conditions.

It is still further an object of the invention to provide a novel chain saw vibration isolation assembly which is low in initial cost, simple to install and readily serviceable.

It is another object of the invention to provide a novel chain saw vibration isolation assembly wherein high strength rubber possessing rugged wear characteristics may be advantageously utilized while maintaining "soft" vibration attenuation characteristics desirable during an unloaded idle condition of the vibration generating assembly.

It is yet another object of the invention to provide a novel chain saw vibration isolation assembly wherein the specific construction of the individual vibration isolation units insures energy transfer through and activity in the molecular chain of an elastomeric member utilized to insure that the elastomeric member behaves as a spring.

It is still another object of the invention to provide a novel chain saw vibration isolation assembly wherein the stability of the isolation system is maximized to facilitate normal operator control during a cutting operation.

Brief Summary:

A preferred embodiment of the invention intended to accomplish at least some of the foregoing objects comprises a vibration generating assembly including an engine and cutter chain drivingly connected with the engine and a supporting and inertia assembly including handle means and a fuel tank which at least partially encompasses the vibration generating assembly. A plurality of vibration isolation assemblies interconnect the vibration generating assembly and the support assembly and each include a first cup mounted upon one of the vibration generating assembly and the supporting assembly and a post mounted upon the other of the vibration generating assembly and the supporting assembly. The post is dimensioned to be coaxially received within the interior of the first cup. Each of the vibration isolation assemblies further includes a second cup composed of an elastomeric material and being dimensioned to contiguously fit within the interior of the first cup. The second cup is provided with at least one elastomeric circumferentially inwardly projecting ring dimensioned to engage, under hoop tension, at least a portion of the exterior surface of the post whereby relative vibrations between the post and first cup will be attenuated by the elastomeric second cup.

THE DRAWINGS

Further objects and advantages of the invention will become apparent from the following detailed description taken in conjunction with the accompanying drawings wherein.

DETAILED DESCRIPTION OF THE INVENTION

Figure 1:
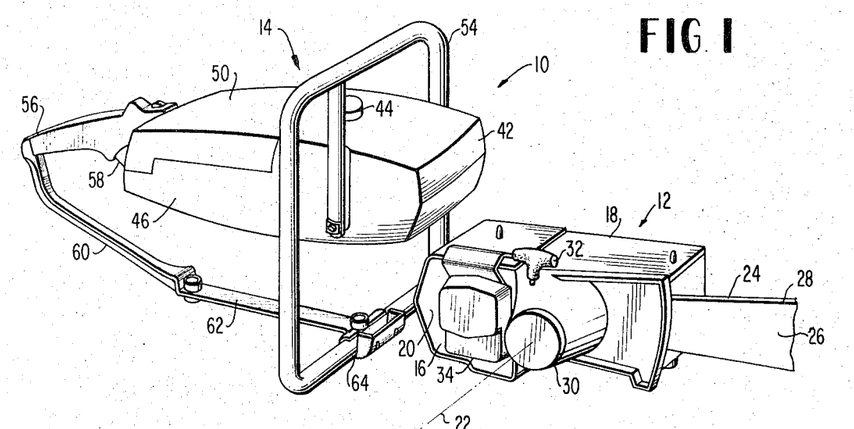
FIG. 1 discloses an axonometric, exploded view of the basic arrangement of a chain saw comprising a vibration generating assembly including an engine and a cutting chain and a supporting assembly including gas tank inertia means and a cage-like frame handle and a trigger handle structure.

Chain saw Context of the Invention:

Referring now to the drawings in which like numerals are utilized to indicate like parts in various views thereof, FIG. 1 discloses an axonometric exploded view of the overall assembly of a chain saw 10 according to the present invention.

A detailed description of the preferred chain saw context of the invention is contained in each of the previously noted Frederickson et al patents. The entire disclosure of each of these patents is hereby incorporated by reference as though set forth at length. Briefly, however, and in order to more fully understand the invention without specific reference to the previously noted Frederickson et al patents, the chain saw 10 is composed of a vibration generating assembly 12 and an encompassing supporting assembly 14.

The vibration generating assembly 12 is of a unitized nature and includes an internal combustion engine 16 which may consist of a cast cylinder or engine housing 18 wherein a reciprocating piston (not shown) is operatively mounted to reciprocate in a generally horizontal plane as viewed in FIG. 1. A shroud 20 partially houses the aftermost end of the engine housing 18. The piston may be connected with a crank shaft (also not shown) in a conventional manner so that the crank shaft is provided with an axis of rotation 22. The crank shaft may be connected by a drive train (not shown) in a conventional manner to a cutting chain 24.

A generally planar and vertically extending guide bar 26 is provided for mounting the cutting chain 24 moveably thereupon. The cutting chain 24 may be of the conventional type comprising an endless link-type chain mounted in a groove 28 defined in the periphery of and circumscribing the guide bar 26. The cutting chain 24 is thereby operatively mounted to follow a path of travel defined by the peripheral groove 28 formed about the guide bar 26. This travel path is arranged to align with a vertical cutting plane extending longitudinally of the generally vertically extending planar guide bar 26.

The drive train (not shown) may be also be of a conventional nature and may be provided for interconnecting the crank shaft with the cutter chain 24. The drive train may include a centrifugal clutch (not shown) which may be housed within portion 30 of the overall housing of the chain saw.

A starter mechanism may also be provided for the chain saw, and in a preferred embodiment, comprises a manually operable pull cord and handle mechanism 32. A spark arrester and a sound muffling device 34 may also be incorporated within the saw assembly and utilized with the engine 16.

The piston, which supplies the power to drive the chain saw, may be connected with the crank shaft so as to reciprocate along a path extending generally longitudinally and parallel with the previously defined cutting plane and guide bar 26. This path taken by the power piston may also be generally aligned with a longitudinal median plane 36 (note FIG. 3) which extends longitudinally of the overall chain saw and which is disposed in general parallel relationship with a cutting plane 38 of the guide bar 26.

Vibrations produced by the vibration generating assembly 12 stem from the cutting chain 24 in the plane of the guide bar 38 and from the horizontally reciprocating piston generally within the medium plane 36. This vibrational energy is concentrated essentially about the center of gravity of the chain saw which is intersected by a plane 40 lying between planes 36 and 38. While it is a difficult matter to define with precision the overall primary plane of vibration of the vibration generating assembly extends essentially along plane 40.

The supporting assembly 14 is also unitized and comprises the remaining portion of the overall chain saw and includes a unitary housing defining a fuel tank 42 which is disposed at a forward end thereof adjacent the guide bar 26. A closure cap 44 is provided on an upper surface of the tank portion 42 to permit access to the interior of the fuel tank through an opening disposed thereunder. An after section 46 of the fuel tank assembly 42 is located generally adjacent and above the engine assembly 18 and houses a conventional carburetor 48 (note FIG. 2).

An air filter (not shown) may be secured above the carburetor 48 by a removable cover member 50 which may be secured in place by a threaded fitment 52.

A first frame handle means 54 extends generally transversely of the cutting plane of the guide bar 26 and the cutting chain 24. A second generally U-shaped handle member 56 comprising a control handle including a throttle trigger mechanisism 58 is integrated with a portion of the fuel tank and air filter housing assembly. The U-shaped member 56 also includes a lower leg portion 60 which is sometimes referred to as a skid bar which includes an under running generally horizontal link 62 which is fixedly connected to the frame handle 54 as at 64.

Figure 2:
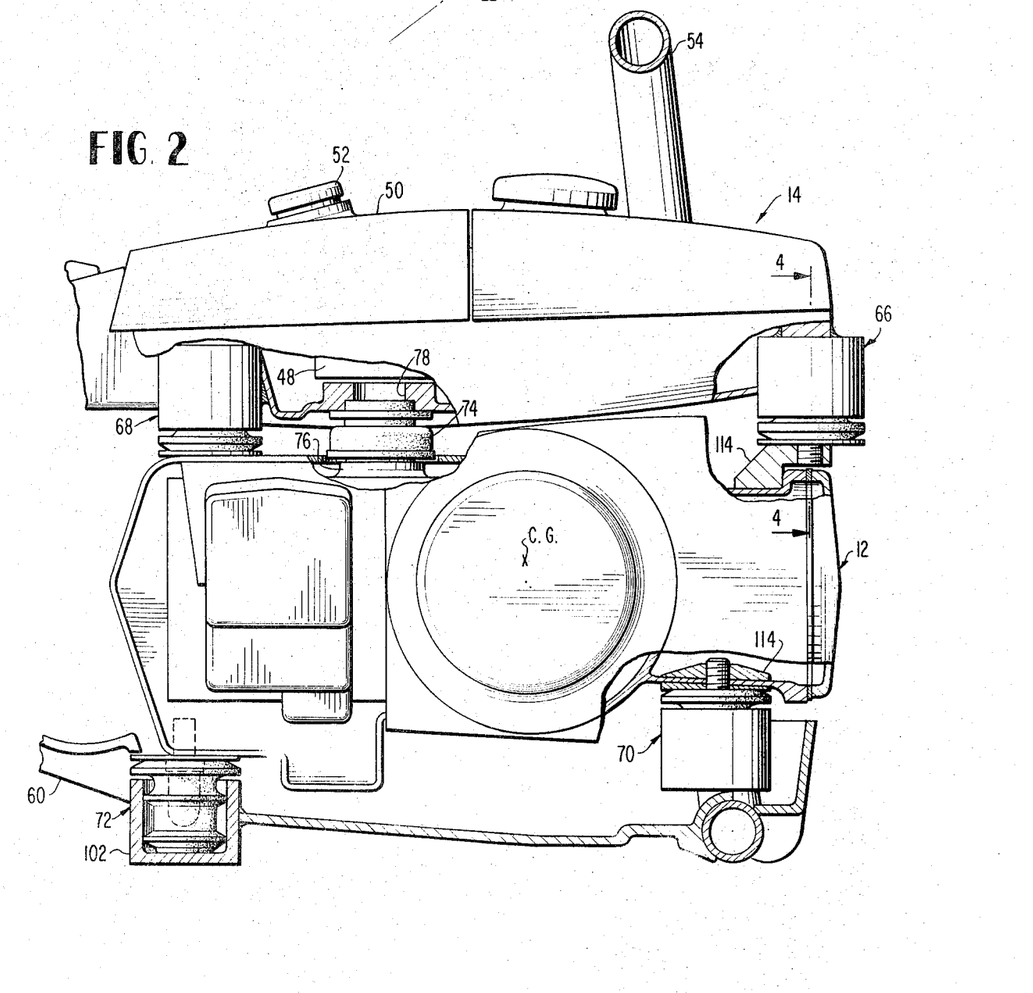
FIG. 2 is a partial side elevational view of the chain saw shown in FIG. 1 and discloses the arrangement and placement of individual vibration isolation units between the vibration generating assembly and the supporting assembly, according to a preferred embodiment of the invention.

In an assembled condition the vibration generating assembly 12 is fitted within the encompassing confines of the supporting assembly 14 in a posture substantially as depicted in cross section in FIG. 2. In this view it will be appreciated that the vibration generating assembly 12 is isolated from metal to metal, and thus vibration transmitting, contact with the supporting assembly 54 by the provision of a first 66 and a second 68 vibration isolation mounting assembly disposed upon opposite sides of the center of the gravity of the overall chain saw C. G. and between an upper portion of the vibration generating assembly 12 and an under portion of the supporting assembly 14. Further, a third 70 and a fourth 72 vibration isolation unit is mounted upon opposite sides of the center of gravity C.G. and the axis of crankshaft rotation and between an under portion of the vibration generating assembly 12 and an upper portion of the supporting assembly 14.

The specific structure and arrangement of the individual vibration isolation units comprise the subject matter of the instant invention and will be discussed more fully hereinafter. For the present however, it will be noted that the assemblies act to isolate from metal to metal, and thus vibration transmitting, contact the vibration generating assembly 12 and the supporting assembly 14.

To provide fluid communication between the carburetor mounted upon the support assembly 14 and the intake of the internal combustion engine mounted upon the vibration generating assembly 12 a flexible bellows communicating sleeve 74 is extended between the inlet 76 of the cylinder and the outlet 78 of the carburetor. For a more detailed discussion of the specific construction of the elastomeric bellows 74 reference may be had to the previously noted Frederickson et al patents.

Vibration Isolation Unit

Figures 4, 6:
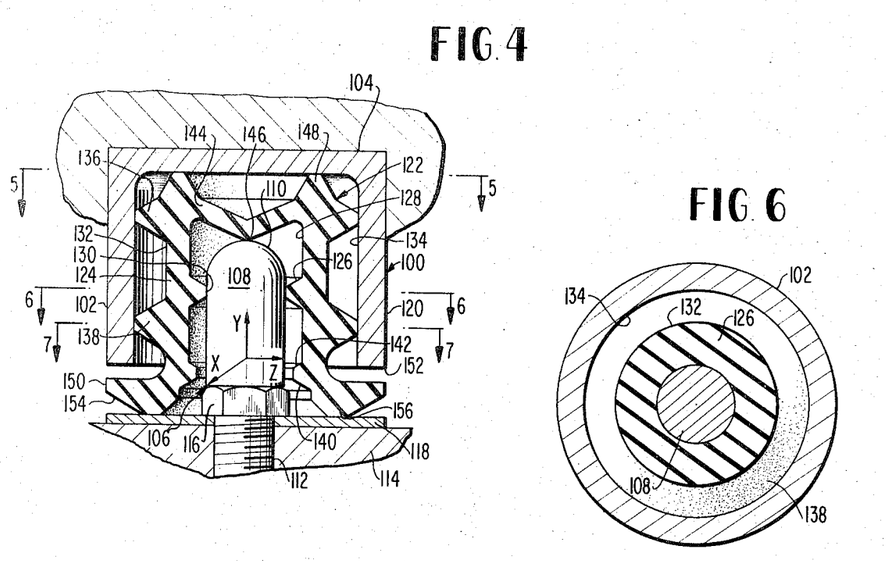
FIG. 4, note sheet 2, is a cross sectional view taken along section line 4—4 in FIG. 2 and discloses a detailed partial sectional view of an individual vibration isolation unit according to a preferred embodiment of the invention.
FIG. 6 is a cross-sectional view taken along section line 6—6 in FIG. 4.
Figure 5:
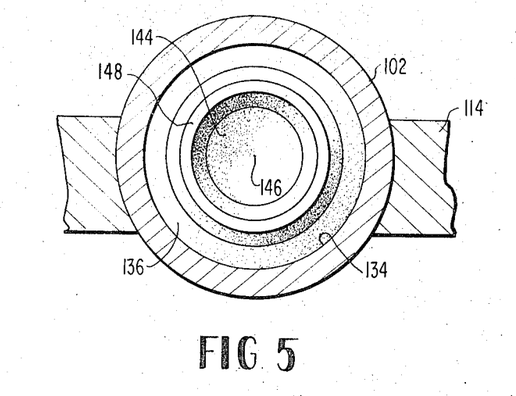
FIG. 5 is a cross-sectional view taken along section line 5—5 in FIG. 4.
Figure 7:
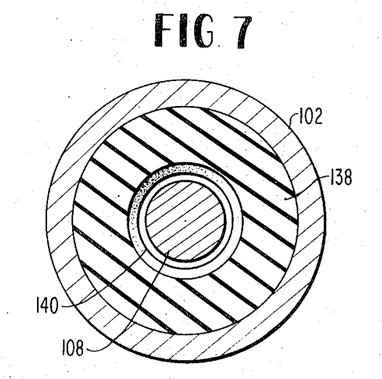
FIG. 7 is a cross-sectional view taken along section line 8—8 in FIG. 4.

Each of the previously noted individual vibration isolation units 66, 68, 70 and 72 are identical in construction and are dislcosed in detail in FIGS. 4, -7.

More specifically each of the vibration isolation assemblies includes a first cup 100 composed of a member having cylindrical side walls 102 and a normally extending bottom wall 104.

A second element of each vibration isolation unit comprises a post or stud 106. The post 106 is composed of a solid cylindrical member 108 having a hemispherical end cap 110 affixed to the free end thereof. The base of the post 106 is provided with conventional threads 112 so that the post may be threadedly connected to a mounting assembly 114 carried by the vibration generating assembly. Connection of the post 106 with the vibration generating assembly 12 is facilitated by the provision of a hexagonal set of wrench flats 116 fashioned about the base of the cylindrical surface 108.

A bearing plate or washer 118 is coaxially positioned upon the threads 112 beneath the wrench flats 116 and is diametrically dimensioned to coextend with an outer surface 120 of the cylindrical first cup wall 102.

The final member of each of the vibration isolation units is comprised of a second cup 122. The cup 122 is preferably entirely composed of an elastomeric material such as high strength natural rubber in the 50–60 durometer range. Those skilled in the art will recognize that rubber in this range is extremely rugged and of high strength and will normally exhibit long wearing characteristics.

Structurally the second or elastomeric cup 122 is fashioned with generally cylindrical side walls 124. A first peripheral ring 126 is mounted upon the interior surface 128 of the side walls 124 and projects inwardly leaving a coaxial aperture 130 within the second cup. The dimetrical extent of the aperture 130 with respect to the diameter of the cylindrical wall 108 of post 106 is such that an interferance fit is provided and the elastomeric ring 126 is placed under slight hoop tension when the post is inserted within the second cup.

The exterior surface 132 of the side wall 124 is dimensioned to be concentrically spaced from the interior surface 134 of the first cup. Abutting contact, however, is provided between the wall 124 of the second cup and the interior surface 134 of the first cup by the provision of a first 136 and a second 138 annular ring of elastomeric material which serves to contact the interior surface of the second cup in slight compression.

From the foregoing discussion of the structural arrangement of the second cup 122 it will be appreciated that if vibrational forces are transmitted from the post 106 in any direction in the XZ plane initially the hoop tension of ring 126 along with bending of wall 124 supported at fulcrums provided by exterior rings 136 and 138 will serve to resist the motion of post 106. This motion in the initial stage is therefore resisted by a relatively low spring rate resulting from hoop tension and bending.

The interior surface 128 of the wall 124 is further provided with a second peripheral ring 140 which is axially spaced from inwardly projecting ring 126 and forms a second aperture 142 within the second cup 122. The diameter of aperture 142 is designed to be greater than the diameter of cylinder 108 such that upon initial movement of the post 106 in XZ plane the foregoing discussed low spring rate will be in effect. A larger deviation from axial concentricity with the second cup 122, however, will serve to bring the cylinder wall 108 into contact with the second peripheral ring 140. Such contact will serve to compress exterior ring 138 and substantially raise the resistive spring rate of the elastomeric cup 122.

The cup 122 is further provided with an elastomeric end wall 144 which conically projects within the cup 122 and terminates in an apex 146 abutting against the hemispherical end cap 110 of the post 106.

An elastomeric peripheral ring 148, constituting an extension of the side walls 102, directly connects with the end wall 144 and serves to provide abutting contact with the bottom wall 104 of the first cup 100.

The second cup 122 is further provided with an elastomeric flange 150 projecting from the free end of the wall 124 radially outwardly between the free end 152 of the first cup member 100 and the bearing washer 118. The elastomeric flange 150 is fashioned with an integral ridge 154 coaxially extending about the post 106 and abutting at its apex against the bearing washer 118.

In view of the most recently discussed structural aspects of the elastomeric cup 122, it will be appreciated that vibrational forces tending to displace post 106 in the Y direction will initially exhibit compressive forces at the apex 146 of the cone 144 and at the apex 156 of the peripheral ring 144 with a low spring rate. This spring rate, however, will rapidly increase as displacement increases until solid elastomeric compression is realized. In view of the previously noted selection of a rubber in the 50-60 durometer range, such pure compression will exhibit extremely rugged resistance to full metal to metal contact of the post 106 with the first cup 102.

Mounting Arrangement of Individual Vibration Isolation Units

Figure 3:
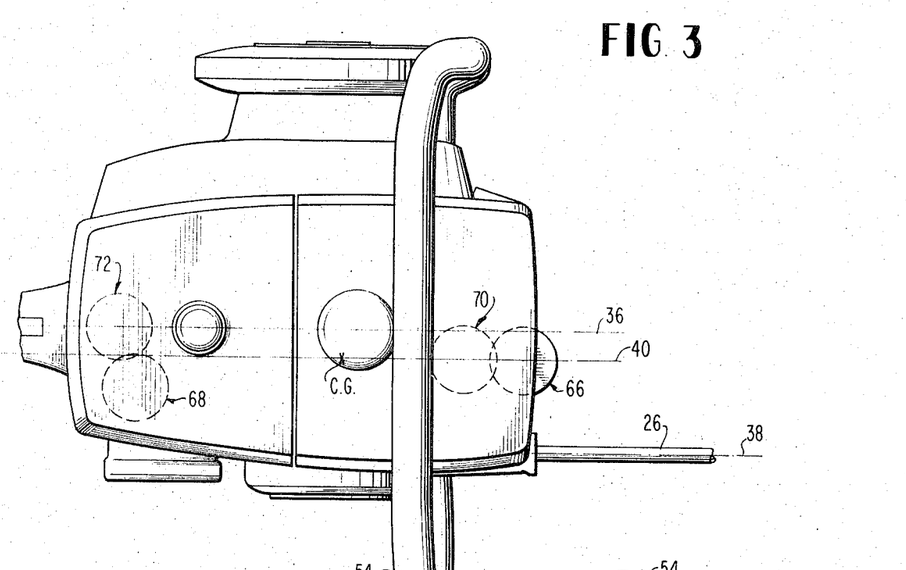
FIG. 3, note sheet 3, is a top view of the chain saw assembly depicted in FIG. 2 and particularly illustrates the generally coplanar relationship of the individual vibration isolation units with a primary plane of vibration of the chain saw.

Referring now particularly to FIGS. 2 and 3 there will be seen a preferred embodiment of the mounting arrangement of four of the previously discussed individual vibration isolation units 66, 68, 70 and 72.

More specifically, the upper isolation units 66 and 68 are mounted between an upper surface of the vibration generating assembly 12 and an under surface of the supporting assembly 14. Preferably, the post members 106 are mounted upon the vibration generating assembly 12. The upper vibration isolation assemblies are spaced upon opposite sides of the center of gravity C.G and the crankshaft axis of rotation 22 in a wide stance operation to facilitate stability of the connecting assembly.

The lower vibration isolation units 70 and 72 in a similar manner have the posts thereof connected directly to the vibration generating assembly 12 and the first cup units are connected directly to the supporting assembly 14. The units 70 and 72 in a manner similar to units 66 and 68 are provided with a widespread stance on opposite sides of the axis of crankshaft rotation. As particularly illustrated in FIG. 3, the front upper and lower vibration isolation units 66 and 70 are in substantial vertical alignment while the rear upper and lower vibration isolation units 68 and 72 are also in a substantially vertical alignment. This widespread four corner bearing arrangement provides a high degree of stability for the mounting arrangement and thus operator cutting and manipulative control of the chain saw is facilitated.

Further by reference to FIG. 3, it will be noted that the axis of each of the vertically mounted individual vibration isolation units 66, 68, 70 and 72 lie substantially upon the plane 40 of envisioned primary vibration.

Figure 8:
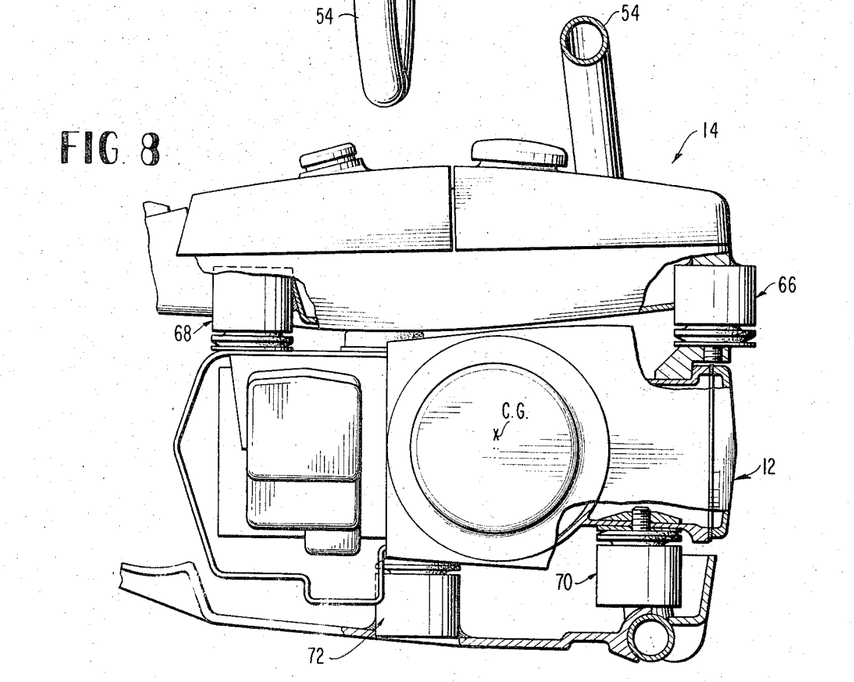
FIG. 8 is a partial cross-sectional view similar in character to that of FIG. 2 and discloses an arrangement and placement of individual vibration isolation units between the vibration generating assembly and the supporting assembly, according to an alternate preferred embodiment of the invention.

While the mounting arrangement of the individual vibration isolation units as depicted in FIG. 2 is preferred, in some instances are alternate structural placement may be desired such as specifically depicted in FIG. 8. In this connection the lower rear vibration isolation unit 72 is moved forward more toward and beneath the center of gravity of the chain saw.

It is envisioned that the mounting arrangement depicted in FIG. 8 may be advantageously utilized in at least those instances where relatively small chain saws are being manufactured or where it becomes objectionable to permit the first cup 100 to project below the skid bar 60 of the supporting structure as depicted in FIG. 2.

SUMMARY OF THE MAJOR ADVANTAGES OF THE INVENTION

In describing the invention, various advantageous aspects have been specifically and inherently delineated.

A principle advantage relies in the provision of a chain sae vibration isolation assembly wherein a variable spring rate is incorporated into each individual vibration isolation unit whereby a soft spring rate is initially encountered but which will rapidly increase in response to major deviations by the vibration generating unit with respect to a supporting unit. This variation in spring rate enables the resonant vibration of the vibration isolation units to be designed continuously below the resonanting frequency of the vibration generating assembly even during unloaded idling of the generating assembly.

Another significant advantage provided by the free post and surrounding cup arrangement of the individual vibration isolation units is the capability to attenuate vibrations in three mutually perpendicular axes of movement.

Yet another advantage is the fail-safe character of the post and cup vibration isolation assemblies. More particularly, even if the elastomeric second cup should completely rupture, metal to metal contact will be established thus preventing further separation. It will be appreciated from a safety point of view that the possibility of completely severing a connection between the cutting chain assembly and the supporting handle assembly is potentially dangerous and that the fail-safe character of the subject invention is a highly significant safety advantage.

By the provision of the concentric rings and cones of the elastomeric second cup assembly to provide low spring rate compression at the cone and ring apexes as well as bending a high strength rubber composition in the 50–60 durometer range may be utilized for long life and capability to withstand substantial impact loads while providing the previously noted soft vibration isolation necessary during idling and minimum loading.

Yet another advantage is realized by the arrangement of the individual vibration isolation units in a four point widespread stance about the center of gravity of the vibration generating assembly to provide maximum stability and ensure firm operator control of the chain saw. Still further the individual vibration isolation units are mounted substantially in a vertical plane of primary vibration in order to minimize vibrations transmitted into the supporting handle assembly.

Yet another significant advantage is the provision of a low cost vibration isolation assembly which is simple to install and is readily serviceable in the field. In this connection, if one of the elastomeric cups should fail another may be readily inserted since the cups are not bonded to either the first metallic cup or the metallic post.

Although the invention is disclosed with reference to preferred embodiments, it will be appreciated by those skilled in the art that additions, deletions, modifications, substitutions and other changes not specifically described and illustrated may be made which will fall within the purview of the appended claims.

What is claimed is:

1. In a chain saw having
   a vibration generating assembly including engine means; cutter chain means, drivingly connected with said engine; and
   a supporting assembly including handle means; and
   a plurality of vibration isolation means interconnecting said vibration generating assembly and said supporting assembly;
   wherein the improvement comprises:
   each of said vibration isolation means including,
      a first cup means mounted upon one of said vibration generating assembly and said supporting assembly;
      a post mounted upon the other of said vibration generating assembly and said supporting assembly and being diametrically dimensioned to be freely coaxially inserted within said first cup; and
      a second cup means composed of an elastomeric material and being dimensioned to contiguously fit within the interior of said first cup, said second cup having at least one circumferential inwardly projecting ring, said one ring being dimensioned to engage under hoop tension at least a portion of the exterior surface of said post whereby relative vibration between said post and said first cup will be attenuated by said elastomeric second cup;
   said first and second cup means and said post of each of said plurality of vibration isolation means each have generally cylindrical side walls; and
   another elastomeric circumferential ring, inwardly projecting within said second cup, said ring being axially displaced with respect to said one circumferential ring and being dimensioned to concentrically surround said cylindrical post in a posture normally spaced from said cylindrical post coaxially within said first and second cup means.

2. In a chain saw having
   a vibration generating assembly including engine means;
   cutter chain means, drivingly connected with said engine; and
   a supporting assembly including handle means; and
   a plurality of vibration isolation means interconnecting said vibration generating assembly and said supporting assembly;
   wherein the improvement comprises:
   each of said vibration isolation means including,
      a first cup means mounted upon one of said vibration generating assembly and said supporting assembly;
      a post mounted upon the other of said vibration generating assembly and said supporting assembly and being diametrically dimensioned to be freely coaxially inserted within said first cup; and
      a second cup means composed of an elastomeric material and being dimensioned to contiguously fit within the interior of said first cup, said second cup having at least one circumferential inwardly projecting ring, said one ring being dimensioned to engage under hoop tension at least a portion of the exterior surface of said post whereby relative vibrations between said post and said first cup will be attenuated by said elastomeric second cup;
   said first and second cup means and said post of each of said plurality of vibration isolation means each have generally cylindrical side walls;
      a first elastomeric circumferential ring extending about the exterior surface of said second cup means and contiguously abutting against the interior surface of said first cup means; and
      a second elastomeric circumferential ring extending about the exterior surface of said second cup and contiguously abutting against the interior cylindrical surface of said first cup means.

3. An improvement in a chain saw as defined in claim 2 wherein: said first and second circumferential rings extending about the exterior surface of said second cup means being axially positioned upon opposite sides of said one circumferential inwardly projecting ring whereby said first and second circumferential exterior rings serve as fulcrum points for bending of the cylindrical wall of said second cup means in the event a radially outward force is imposed upon said one circumferential inwardly projecting ring.

4. In a chain saw having
   a vibration generating assembly including engine means;
   cutting chain means, drivingly connected with said engine; and
   a supporting assembly including handle means; and
   a plurality of vibration isolation means interconnecting said vibration generating assembly and said supporting assembly;
   wherein the improvement comprises:
   each of said vibration isolation means including,
      a first cup means mounted upon one of said vibration generating assembly and said supporting assembly;
   a post mounted upon the other of said vibration generating assembly and said supporting assembly and being diametrically dimensioned to be freely coaxially inserted within said first cup; and
   a second cup means composed of an elastomeric material and being dimensioned to contiguously fit within the interior of said first cup, said second cup having at least one circumferential inwardly projecting ring, said one ring being dimensioned to engage under hoop tension at least a portion of the exterior surface of said post whereby relative vibrations between said post and said first cup will be attenuated by said elastomeric second cup; and
   an inwardly projecting cone coaxially postured within the base of said second cup means, wherein the apex of said cone abuttingly contacts the free end of said post.

5. An improvement in a chain saw as defined in claim 4 wherein:
   said post is fashioned with an integral hemispherical surface upon the free end thereof which directly and coaxially contacts the apex of said elastomeric cone within the bottom of said second cup means.

6. An improvement in a chain saw as defined in claim 5 and further comprising:
an elastomeric ring coaxially mounted upon the exterior surface of the base of said second cup means and abutting against the base of said first cup means, said ring forming a fulcrum for the bottom wall of said second cup means whereby coaxial depression of said inwardly projecting cone will serve to bend the bottom of said second cup means.

7. In a chain saw having
a vibration generating assembly including engine means;
cutter chain means, drivingly connected with said engine; and
a supporting assembly including
handle means; and
a plurality of vibration isolation means interconnecting said vibration generating assembly and said supporting assembly;
wherein the improvement comprises:
each of said vibration isolation means including,
a first cup means mounted upon one of said vibration generating assembly and said supporting assembly;
a post mounted upon the other of said vibration generating assembly and said supporting assembly and being diametrically dimensioned to be freely coaxially inserted within said first cup; and a second cup means composed of an elastomeric material and being dimensioned to contiguously fit within the interior of said first cup, said second cup having at least one circumferential inwardly projecting ring, said one ring being dimensioned to engage under hoop tension at least a portion of the exterior surface of said post whereby relative vibrations between said post and said first cup will be attenuated by said elastomeric second cup;
a peripheral flange composed of elastomeric material radially projecting from the free edge of said second cup means;
bearing means coaxially mounted upon said post and being axially spaced from the free end of said first cup means, whereby said peripheral flange of elastomeric material is dimensioned to abut against said bearing means while being spaced from the free end of said first cup means; and
a circular ridge formed upon said elastomeric flange and extending in intimate contact with said bearing means.

8. In a chain saw having
engine means;
cutter chain means;
the engine means being drivingly connected with the cutter chain means;
the engine means including a crank having an axis of rotation;
the engine means and the cutter chain means comprising a vibration generating first assembly;
a supporting second assembly extending at least in part above and below said vibration generating assembly and including
handle means;
the cutter chain means and the axis of rotation of the crank being generally arranged to form a primary plane of vibration for the vibration generating first assembly; and
a plurality of vibration isolation means interconnecting said vibration generating assembly and said supporting assembly;
wherein the improvement comprises:
each of said vibration isolation means including,
first cup means mounted upon one of said vibration generating assembly and said supporting assembly;
a post mounted upon the other of said vibration generating assembly and said supporting assembly and being diametrically dimensioned to be freely coaxially inserted within said first cup means;
a second cup means composed of an elastomeric material and being dimensioned to contiguously fit within the interior of said first cup means said second cup having at least one circumferential inwardly projecting ring, said one ring being dimensioned to engage under hoop tension at least a portion of the exterior surface of said post, said second cup having at least another elastomeric circumferential ring, inwardly projecting within said second cup, said another ring being axially displaced respect to said one circumferential ring and being dimensioned to concentrically surround said cylindrical post in a posture normally spaced from said cylindrical post coaxially within said first and second cup means;
a first pair of said vibration isolation means being mounted above said vibration generating assembly between said vibration generating assembly and said supporting assembly upon opposite sides of the axis of rotation of said engine crank; and a second pair of said vibration isolation means being mounted beneath said vibration generating assembly and between said vibration generating assembly and said supporting assembly upon opposite sides of the axis of rotation of said engine crank.

9. An improvement in a chain saw as defined in claim 8 wherein:
all four of said vibration isolation means being mounted substantially in the plane of primary vibration of the vibration generating assembly.

10. An improvement in a chain saw as defined in claim 9 wherein:
the top and bottom vibration isolation means mounted on a first side of the axis of rotation of said engine crank are in substantial vertical alignment; and
the top and bottom vibration isolation means mounted upon the other side of the axis of rotation of said engine crank are also in substantial vertical alignment.

* * * * *

UNITED STATES PATENT OFFICE
CERTIFICATE OF CORRECTION

Patent No. 3,845,557            Dated November 5, 1974

Inventor(s) Jay Richard Bailey

It is certified that error appears in the above-identified patent and that said Letters Patent are hereby corrected as shown below:

Column 6, line 56, after "in" insert --the--.

Column 7, line 65, after "instances" change "are" to --an--.

Column 8, line 16, after "A" change "principle" to --principal-- and change "relies" to --lies--.

Column 8, line 17, after "chain" change "sae" to --saw--.

Signed and sealed this 1st day of April 1975.

(SEAL)
Attest:

RUTH C. MASON
Attesting Officer

C. MARSHALL DANN
Commissioner of Patents
and Trademarks